April 15, 1969   J. AERTS   3,438,518
MEASURING METHOD AND APPARATUS
Filed April 7, 1966   Sheet 1 of 2
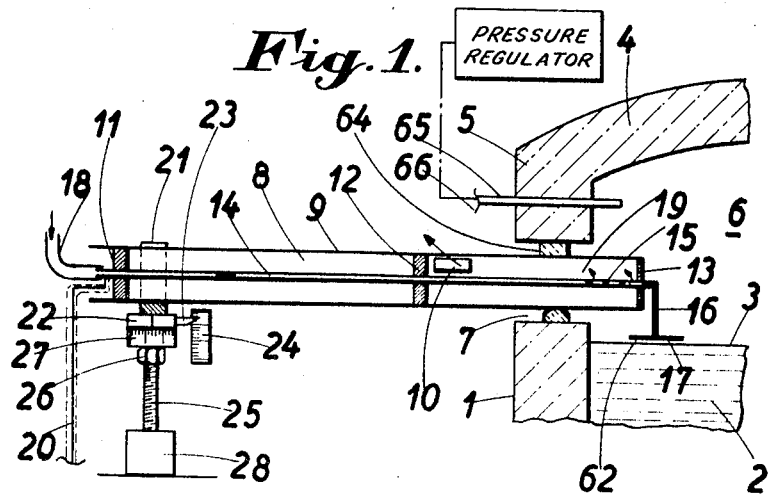
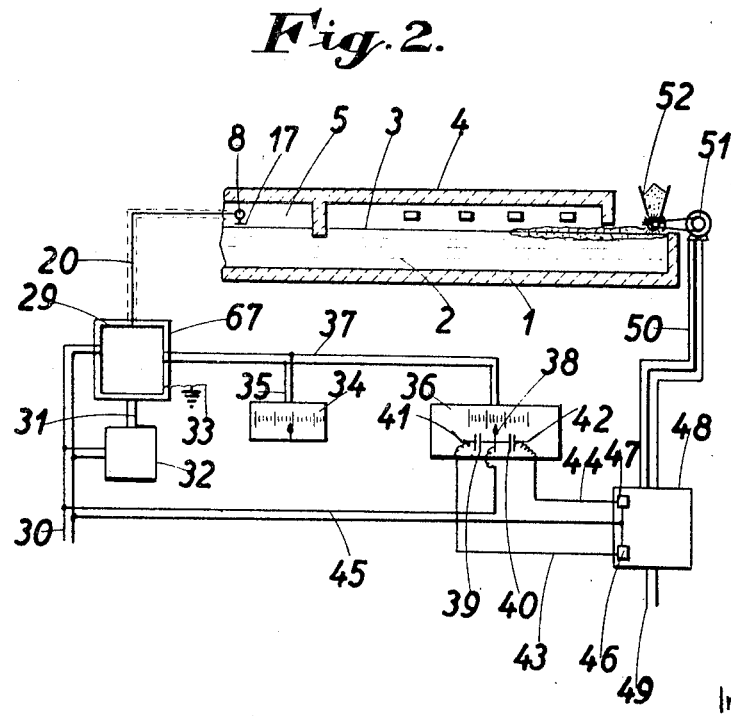
Inventor:
Josef Aerts
By: Spencer & Kaye
Attorneys Inventor:
Josef Aerts
By: Spencer & Kaye
Attorneys

United States Patent Office 3,438,518
Patented Apr. 15, 1969

3,438,518
MEASURING METHOD AND APPARATUS
Josef Aerts, Balen-Nette, Belgium, assignor to Glaverbel S.A., Brussels, Belgium
Filed Apr. 7, 1966, Ser. No. 541,014
Claims priority, application Luxembourg, Apr. 9, 1965, 48,366
Int. Cl. F23k 5/00
U.S. Cl. 214—18.2          24 Claims

ABSTRACT OF THE DISCLOSURE

Method and apparatus for measuring the surface level of an electroconductive liquid at a high temperature in a vessel by measuring the distance using capacitance between the surface of the liquid and a capacitive electrode positioned above the liquid. The space between the surface of the liquid and such electrode is occupied by a gas the electrical properties of which are kept constant by maintaining the pressure and/or moisture content of such gas in the vessel at a substantially constant level.

---

The present invention relates to the field of liquid measuring, and particularly to a method and apparatus for measuring the level of a body of conductive liquid.

In order to measure the level of liquid in a vessel, numerous methods have already been proposed using a float operatively associated with a liquid level indicator. However, it has been found that such apparatus can not be used for determining the level of highly corrosive liquids. For example, in the case of molten glass it has been difficult to find a material which will serve as a float and yet which will not be rapidly corroded by the molten glass or by the heated atmosphere of the furnace. If a float made of corrosible material were used for such a purpose, the corrosion of the float in the glass-containing vessel would not only lead to inaccuracies in determining the molten glass level, but it would also present the drawback that the dispersion of corrosion products in the bath would result in the production of defective glass. Moreover, the previously proposed float-type mechanisms are not capable of yielding highly accurate measurements.

Various types of optical apparatus have also been proposed in which the displacement of a light beam reflected from the surface of the liquid mass is measured by means of one or more photoelectric cells. It has been found that apparatus of this type is often unable to give precise indications because of the occurrence of unavoidable disturbances affecting the path followed by the light beam.

It is also possible to letermine the liquid level by measuring the pressure existing in a conduit from which air is blown at a constant rate through an orifice located very close to the liquid surface. This procedure permits a liquid level to be measured with an accuracy of the order of ±0.1 mm.

A large variety of electrical devices have also been proposed for measuring the level of a conductive liquid, such as liquid glass at high temperature, through the use of one or more metallic electrodes contacting the liquid. The electrodes are either stationary or are caused to move continuously up and down until it contacts the liquid. The liquid level is determined by detecting the electrode position or the instant at which current begins to flow between the electrode and the liquid. These arrangements possess several inherent drawbacks, primarily as a result of the contact between the electrodes and the liquid. For example, the electrode portions which contact the molten glass are subjected to a more or less rapid corrosion, to oxidation, and to the deposition of glass or other materials thereon which acts to modify the reference level of the electrodes and thus gives rise to false readings and inaccurate control of the liquid level. Moreover, when an electrode is drawn out of the glass bath with which it has been in contact, either as a result of a drop in level of the bath or due to the movement of the electrode, glass fibers will be drawn out of the bath by the electrode so as to maintain the electrode and the bath in electrical contact for some period of time. Even after these fibers have separated, the electrode will retain a bead of glass which modifies the form of its contact end. When the electrode is once again brought close to the glass bath, the meniscus which will form between the bath and the glass bead on the electrode will give rise to false level indications.

It is a primary object of the present invention to overcome these drawbacks.

Another object of the present invention is to provide a novel method for measuring the level of a mass of electrically conductive liquid with a high degree of accuracy.

Another object of the present invention is to provide a novel apparatus for carrying out the above method.

Still another object of the present invention is to measure the level of a mass of conductive liquid while avoiding any contact between the measuring element and the liquid.

According to one principal feature of the present invention, it is contemplated to carry out a method of determining the surface level of a body of electrically conductive liquid in a vessel by creating an electric field between the surface of such liquid and a stationary plane above such surface, and by measuring the capacitance, the region traversed by this field to thus provide an indication of the level to be determined.

In accordance with another feature of the present invention, the above-described method is combined with a further step of automatically controlling the flow rate of material through the vessel in response to signals indicating the capacitance value of the region for maintaining the liquid at a substantially constant, predetermined level.

The present invention also involves liquid surface level measuring means provided in combination with a vessel for storing a mass of conductive liquid. Basically, this measuring means includes an electrode, means for supporting the electrode above a predetermined level to which the vessel is fillable, and circuit means connected to the electrode for determining the value of the electric capacitance between the electrode and the liquid mass stored in the vessel.

The measuring technique according to the present invention relies on the fact that the capacitance in the region between the upper electrode and the surface of the conductive liquid mass is inversely proportional to the distance therebetween. Instruments are commercially available which measure, directly or indirectly, the capacitance between two conducting bodies, with a very high degree of accuracy and such an instrument can be used in the practice of the present invention to enable the height of the surface level of the conductive fluid to be measured with a correspondingly high degree of accuracy.

Various types of capacitance measuring instruments, which are well known per se, utilize an amplifier which amplifies an alternating current whose amplitude is proportional to the capacitance to be measured. Such instruments are suitable for use in the practice of the present invention. The use of an amplifier not only permits a higher degree of precision to be attained, but also permits the sensitivity of the circuit to be varied as needed by simply adjusting the amplifier amplification factor.

Measurements can be made, for instance, by applying a very low voltage, of the order of one volt for example, with the result that safety precautions for protecting workers from electrical hazards are rendered unnecessary.

Additional objects and advantages of the present invention will become apparent upon consideration of the following description when taken in conjunction with the accompanying drawings in which:

FIGURE 1 is an elevational, cross-sectional view of a portion of a glass melting furnace and a portion of a level measuring system constituting a first embodiment of the present invention.

FIGURE 2 is an elevational view, partly in a cross section perependicular to the plane of FIGURE 1 and partly in schematic form, showing a liquid level control arrangement according to the present invention.

Figure 3:
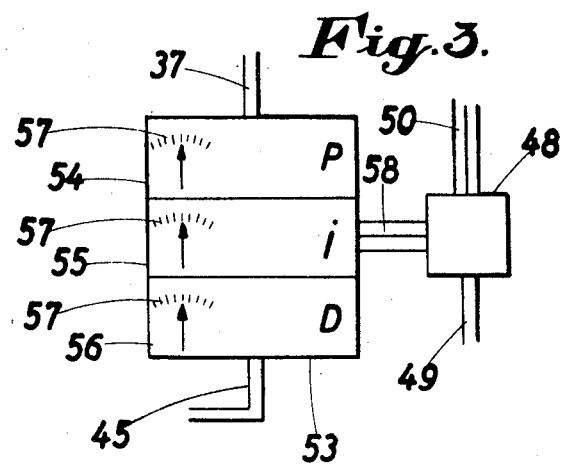
FIGURE 3 is a block diagram of a portion of the feed control arrangement of FIGURE 2.

Referring now to FIGURES 1 and 2 in detail, there is shown a glass melting tank furnace 1 containing a molten glass bath 2 whose surface extends to the level 3. The glass bath is covered with a lid 4 which, together with the side walls 5, encloses a space 6 which is filled with hot gases when the furnace is in use. An insulating support tube 8 for an upper electrode 17 extends through an opening 7 in one side wall 5. The tube may be made of quartz or of very pure alumina and is provided with an opening 10 in its wall 9 at some distance from the side wall 5. A hollow stainless steel tube 14 to which an insulated conductor lead 20 is connected is supported within tube 8 by annular electrically insulating plugs 11, 12 and 13. Holes 15 are provided in the wall of the tube 14, at a region thereof which is located in the furnace. This tube 14 is joined to a solid rod 16 which carries a horizontal plate electrode 17 at its lower end. The rod 16 and the plate 17 are made of refractory steel. The plate electrode 17 is supported at a position such that its lower face is very close to the level 3 up to which the tank can be filled with molten glass.

The inner tube 14 is connected by means of a flexible tube 18, to a source of cooling air which flows through this inner tube 14 up to the end thereof located in the furnace, then through the holes 15 and into the space 19 between tube 14 and the surrounding insulating tube 8, and then through the opening 10 to the atmosphere. As both of the horizontal tubes 8 and 14 are air-cooled, they are not subjected to any deformation. The plate 17, however, is not noticeably cooled by the cooling air.

The cooling of tubes 8 and 14 by the passage of air has the primary purpose of preventing the deformation of these tubes in order to prevent variations in the vertical position of plate, or electrode 17.

The mounting of tube 14 within tube 8 through the intermediary of insulating spacers 11, 12 and 13 serves to assure that plate 17 will be effectively insulated from the walls of tank 1. Such an electrical insulation is necessary because even a very small current leakage to the tank wall would effectively short-circuit the capacitor inasmuch as the tank wall will normally be in electrically conducting relationship with the bath 2. In addition, the provision of the insulating tube 8 can also serve to increase the rigidity with which plate 17 is supported. The insulating tube 8 is preferably made of a material such as quartz which has the required mechanical strength and electrical resistance at high temperatures, or it can be formed from an alumina having a high purity, which material has a highly stable electrical resistivity.

The insulating support tube 8 is supported at its outer end by a collar 21 connected to a ring 22 carrying a pointer 23 which cooperatese with a fixed calibrated scale 24. The ring 22 rests on a support comprising a cylindrical upper portion 27 and an underlying hexagonal portion 26 which are rigidly secured to a spindle 25 which is screw threaded into a stationary base 28. Rotation of the spindle 25, for example by a spanner engaging the hexagonal portion 26, causes the support to move upwardly or downwardly according to the direction of rotation. The ring 22 is itself held against rotation so that its pointer 23 moves vertically along the scale 24 which, together with a peripheral scale on the upper portion 27 of the support, enables the height of the outer end of the electrode support tube 8 to be determined with a high degree of precision. The tube 8 can thus be made to pivot about its support in the side wall 5 of the tank so as to effect a precise adjustment of the level of the electrode formed by plate 17. The precision of the adjustment of the height of electrode 17 is augmented by the fact that the lever arm from collar 21 to the pivot point of tube 8 is several times longer than that from electrode 17 to this pivot point. As a result, any inaccuracies in the positioning of the height of electrode 17 will only be a fraction of the inaccuracy of the positioning of pointer 23.

The conductor 20 connects the upper electrode 17 to an instrument 29 (FIGURE 2) for measuring the capacitance of the capacitor formed by that electrode and the electrically conductive molten glass in the tank. The instrument 29 is connected to an electrical supply mains by conductors 30 and a high frequency alternating voltage, generated by the oscilaltor 32, is simultaneously applied to the instrument via conductors 31. Due to the fact that the bath 2 is constituted by a relatively large mass of molten glass, the glass remains at ground potential without it being necessary to connect it to ground by means of a separate lead. The circuit incorporating the capacitor and the measuring instrument thus consists of the bath of molten glass at ground potential, the electrode 17, the metal tube 14, the conductor lead 20, the measuring instrument 29 (which incorporates an amplifier), and a ground lead 33 connected to instrument 29.

The instrument 29 yields signals which at any given instant are indicative of the distance then existing between the fixed electrode 17 and the surface 3 of the glass. The nature of the output signals from the instrument 29 depends upon the instrument design but may, for example, be in the form of a voltage which varies in proportion to, or at least in dependence on, the variations in the bath level. The output signals are transmitted via conductors 35 to a visual level indicator 34. In the actual illustrated example, the output signals are also transmitted via conductors 37 to a receiver 36 forming part of a control system for controlling the feed of material into the tank furnace.

The receiver 36 includes a mobile contact member 38 which moves in dependence on the signals from instrument 29. The mobile contact member 38 carries a pointer, which moves over a calibrated scale, and a pair of contacts 39 and 40. The member 38 is movable laterally, in dependence on the value of the received signals, between two contacts 41 and 42 which are manually adjustable as to their positions and which are connected by means of flexible connections to conductors 43 and 44, respectively. The mobile contacts 39 and 40 are connected by means of a flexible wire to one of the main conductor leads 30 by one of two wires 45. The conductors 43 and 44 are connected to the other of the main conductor leads 30 via the other of the said wires 45 and via the coils of relays 46 and 47 of a switching apparatus 48 which is also connected to the mains supply via conductors 49. The apparatus 48 is also connected by means of conductors 50 to a motor 51 which drives a machine 52 for feeding raw material into the tank furnace.

The contacts 41 and 42 of the receiver 36 are pre-set to positions which correspond, on the receiver scale, with the upper and lower limits of a predetermined permissible range of variations in the bath level. So long as the bath level is between these limits neither of the contacts 41 and 42 is contacted by its respective one of the contacts 39 and 40 of the mobile contact member 38. If the level rises to the predetermined upper limit, the contact 40 of the mobile contact member 38 makes contact with the fixed contact 42, so as to energize the coil of the relay 47, in order to vary the voltage or voltages applied to the motor 51 in such a manner as to reduce the rate at which the motor causes material to be fed into the furnace. Similarly, when the level of the molten glass reaches the lower predetermined limit, the contact 39 of mobile contact member 38 makes contact with fixed contact 41 and energizes the coil of the relay 46 so as to cause the motor 51 to increase the rate at which material is fed into the tank.

It has been found that high precision measurements can be obtained with the apparatus of FIGURES 1 and 2 even when the upper electrode 17 is spaced a sufficient distance above the surface 3 to insure that the glass will never touch the electrode, even if the height of the surface varies between fairly large limits. However, it is preferable to position the electrode 17 as close as possible to the surface 3, while assuring that the liquid 2 will never come into contact with the electrode, because a smaller initial spacing between the electrode and the liquid will lead to a greater percentage change in the spacing and hence to a greater capacitance variation, for a given liquid level variation. In addition, the positioning of the electrode 17 close to the surface 3 also permits the surface level to be measured with a higher degree of accuracy because the capacitance of a capacitor increases with decreasing electrode spacing and capacitance measurements are usually more precise at higher capacitance levels.

Because of the last-mentioned consideration, it is preferable, if the liquid level changes by a considerable amount over a period of time, to vary the height of electrode 17 so as to once again achieve a small separation between electrode 17 and the liquid surface. The change in height of electrode 17 will be indicated by the position of pointer 23 with respect to scale 24.

In order to obtain a measurement of the capacitance value between electrode 17 and bath 2, instrument 29, which may be of any well-known, commercially-available type, is connected to apply a high frequency A.C. voltage across the capacitor, and the capacitance impedance, which is a function of its capacitance, is determined by measuring, either directly or indirectly, the current amplitude through the capacitor or a voltage drop, e.g., in a resistor connected in series with the capacitor, produced by this current. A high accuracy measurement can thus be obtained because the current through the low impedance capacitor has a relatively large amplitude.

The use of a high frequency A.C. signal to measure the capacitance between electrode 17 and bath 2 has been found to permit a higher accuracy measurement to be obtained than would be the case if a low frequency signal were used. In addition, the use of a higher frequency signal permits a given accuracy to be achieved with a lower ampltiude A.C. voltage, or with a capacitor having a lower capacitance, i.e., a greater distance may exist between the electrode and surface 3 so that the risk of accidental contact between the electrode and the liquid is reduced, or with reduced transverse dimensions for the electrode 17 so that the electrode occupies a smaller space and can be easily manipulated. All of these improvements are due to the fact that a higher frequency signal produces a higher current flow through a given capacitance.

Because the electrode 17 is not cooled by the cooling gas flowing through tube 14, the electrode will be maintained at the temperature of the surrounding gases and will not cause any cooling of the molten glass directly below it. This is advantageous because a local cooling of the molten glass might sometimes cause a solidification thereof or lead to heterogeneities, or, in the case of tinted glass, to color variations, in the resulting product.

In addition, if the electrode were cooled, water vapor contained in the hot gases in space 6 might condense on the lower electrode surface. Any such condensation would be detrimental to the accuracy of the resulting measurement since the condensed water vapor would alter the effective distance separating the electrode from the surface 3, due to the conductivity of the condensed water, or it would modify the dielectric constant of the region between the electrode 17 and surface 3.

In order to further improve the accuracy of the capacitance measurement, the moisture content of the gas present in the space 6, which gas constitutes the dielectric of the capacitor, should be maintained at as constant a value as possible in order to avoid extraneous fluctuations in the capacitance value. To this end, the opening in the tank wall through which tube 8 is inserted is sealed by means of suitable gaskets or packings 64 so as to substantially prevent gas from leaking out of the region 4 and to prevent outside air from entering the region 6. The sealing arrangement should also be constructed to permit tube 8 to be pivoted when it is desired to change the height of electrode 17. The tank wall is also provided with a pipe 65 whose outer end 66 may be connected to a suitable pressure regulator as shown in FIGURE 1 for maintaining the hot gas in the region 6 at a constant pressure slightly greater than atmospheric.

It has also been found that the accuracy of the output from instrument 29 can be improved by disposing the instrument within an insulated casing 67 and by maintaining a constant temperature within this casing.

The device 48 for regulating the rate at which motor 51 causes material to be fed from hopper 52 into the tank can also be constituted by any one of many well-known, commercially-available units. For example, unit 48 may simply be provided with several resistances in series with the conductor or conductors supplying power to motor 51. Relay 47 can be connected to one series resistance so that the energization of relay 47 when the level of surface 3 reaches the upper limit of its permissible range, will cause this resistance to be placed in series between the mains 49 and the conductor 50, thus reducing the motor speed. Similarly, relay 46 can be connected to another resistance, which is normally in series with conductor 50, in such a way that the energization of this relay, when the level of surface 3 reaches the lower limit of its permissible range, will short-circuit the second resistance and thus cause the speed of motor 51 to increase.

Variations of the feed rate of material into the tank 1 can be effected in direct proportion to variations of the level of surface 3. However, it would also be possible to construct instrument 29 to perform a supplementary differentiating or integrating operation so as to adapt the variations in the material feed rate to a wide range of disturbances to which the bath 2 might be subjected. As a result, the present invention can be used to achieve an accurate liquid level regulation in many types of special situations.

It has been found that by mounting the electrode 17 and in such a way that its height can be varied, apparatus constructed according to the present invention can be particularly well adapted to use in plants for manufacturing various types of rolled glass.

Referring now to FIGURE 3, there is shown another form which may be given the apparatus for controlling the level of the bath 2. This modified apparatus is constituted by a known regulating unit 53 to which the conductors 37 are connected. The unit 53 includes a proportional value regulating unit 54, an integrating regulating unit 55, and a derivative regulating unit 56, each of which units is provided with a control switch 57 for varying or eliminating the control action which it applies to device 48. The resulting output from regulator device 53 is conducted to the apparatus 48 by means of conductors 58 for controlling the speed of motor 51.

Figure 4:
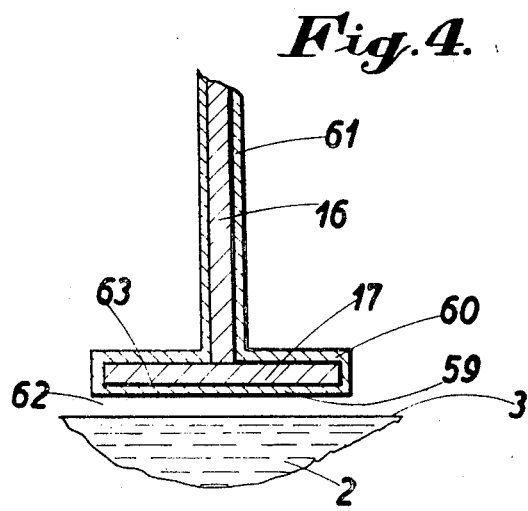
FIGURE 4 is a cross-sectional detail view of one embodiment of an upper electrode according to the present invention.

FIGURE 4 is a detail view showing one embodiment of an electrode arrangement according to the present invention. This embodiment consists of a metal electrode 17 connected to rod 16, the lower surface 63 of electrode 17 being coated with a layer 59 of protective material 59 and the remainder of electrode 17 being coated with a layer 60 of the same material. In addition, at least the lower portion of rod 16 is coated with a layer 61 of the same protective material. Because layer 59 should be spaced far enough above level 3 to avoid coming in contact with the liquid bath the presence of this layer would require a slight increase in the spacing between electrode 17 and level 3. In order to maintain the capacitance reduction due to this increased spacing at a minimum, layer 59 is preferably made of a material having a high dielectric constant. The layers 59, 60 and 61, are also preferably made of a material which will not be subjected to corrosion or oxidation or become coated with deposits, and which will also prevent electrode 17 from undergoing such changes. These layers may be made, for example, of glasses having high melting temperatures, carbides, nitrides, silicides, or borides.

It has been found that apparatus constructed in accordance with the various accuracy-improving considerations described above is capable of measuring variations in the level of a molten glass bath in an industrial glass melting furnace with an accuracy of 0.002 mm., and with an even greater accuracy in a laboratory furnace. As has been previously mentioned, the techniques and apparatus described herein can also be used equally well for determining the level of liquids, other than glass, which have a given electrical conductivity.

It may thus be seen that the present invention can be primarily used to determine a surface level. This can be accomplished by feeding signals indicating the capacitor capacitance value to a suitable meter or the other indicating or recording instrument having a suitable calibrated scale. However, the capacitance value signals obtained need not be used solely for providing a level indication. They can also be used for automatically controlling the rate at which the material is fed into and/or discharged from the liquid-containing vessel for the purpose of maintaining the liquid at a substantially constant level. According to the present invention, the measurement of the liquid level can be made either periodically or continuously.

The technique of the present invention can be employed either by establishing a reference level and providing indications of any deviation of the liquid level therefrom, or by providing an indication of the absolute height of the liquid level at any given time.

It will be appreciated that the present invention is well adapted to measuring the level of molten glass, such as that contained in a glass melting furnace for example, because the fact that the upper electrode need never contact the molten glass causes the deficiencies of the prior art electrical level measuring techniques to be avoided. In addition, the technique according to the present invention has the decided advantage that it requires no moving parts and hence the position of the upper electrode, once adjusted, will not change during any particular measuring interval.

I claim:

1. A method for determining the surface level of a body of electrically conductive liquid in a vessel containing a gaseous atmosphere above the liquid, comprising the steps of:
   (a) creating an electric field between the surface of such liquid body and a stationary part above such surface;
   (b) maintaining the electrical properties of the gaseous atmosphere in the space between such liquid body surface and such stationary part substantially constant; and
   (c) measuring the capacitance of the distance traversed by said field for providing an indication of the level to be determined.

2. A method as defined in claim 1 wherein said step of maintaining further comprises controlling the pressure of the gas in such space.

3. A method as defined in claim 2 wherein said pressure is controlled by enclosing such space and holding the pressure therein at a substantially constant value greater than atmospheric.

4. A method as defined in claim 1 wherein said step of maintaining further comprises holding the moisture content of such space at a substantially constant level.

5. A method as defined in claim 1 further comprising th step of automatically controlling the flow rate of material through such vessel in response to a signal proportional to the time integral of variations in the capacitance value of such space for maintaining the liquid surface at a substantially constant, predetermined level, wherein said flow rate controlling step is accomplished by feeding material to such vessel at a predetermined rate so long as the surface level in such vessel remains within predetermined limits, increasing the rate at which material is fed into such vessel when the level reaches a lower predetermined limit, and decreasing the rate at which material is fed into such vessel when the surface level reaches an upper predetermined limit.

6. A method as defined in claim 1 wherein said stationary part is connected to a supporting arm which is cooled and said stationary part is protected from being cooled by said supporting arm and from the formation of condensation on that surface of said stationary part which faces said liquid body.

7. A method as defined in claim 1 where in said step of maintaining the electrical properties constant is carried out by maintaining the composition of the atmosphere in the space between said stationary part and said liquid body substantially constant.

8. A method as defined in claim 1 wherein such electrode is protected against the formation of oxides on its surface.

9. A method as defined in claim 1 wherein hot gases are present in such vessel above such conductive liquid, comprising the further step of maintaining said upper electrode at the temperature of such gases.

10. In combination with a vessel for storing a mass of conductive liquid, said vessel being fillable up to a predetermined level and containing a gaseous atmosphere above the liquid surface level, measuring means comprising:
   (a) an electrode;
   (b) means supporting said electrode above said predetermined level of said vessel;
   (c) means associated with said vesel for maintaining the electrical properties of the gaseous atmosphere in the vessel between said electrode and the surface of said liquid mass at a substantially constant level; and
   (d) circuit means electrically connected to said electrode for determining the value of the electric capacitance between said electrode and such liquid mass.

11. An arrangement as defined in claim 10 wherein said vessel is provided with a cover enclosing a space above such liquid mass, and said means for maintaining the electrical properties of the gaseous atmosphere includes means for measuring and regulating the pressure in said space.

12. An arrangement as defined in claim 10 wherein said electrode includes a coating of a material having a high dielectric constant.

13. An arrangement as defined in claim 12 wherein said material is substantially unoxidizable.

14. An arrangement as defined in claim 10 wherein said means for supporting said electrode comprise a hollow metal tube and means for causing cooling air to flow therethrough.

15. An arrangement as defined in claim 10 wherein said electrode supporting means is in the form of a supporting arm extending into said vessel, and further comprising means for cooling said supporting arm and means for protecting said electrode against being cooled by said cooling means, whereby said electrode is protected against the formation of condensation thereon.

16. An arrangement as defined in claim 15 wherein said cooling means comprise a circuit having a cooling fluid entry tube and a cooling fluid exit tube, each of said tubes being isolated from the gaseous atmosphere in said vessel.

17. An arrangement as defined in claim 16 wherein said tubes are formed by the division of said tubular supporting arm into two conduits defining flow paths which communicate with one another at the end of said arm which is located inside said vessel.

18. An arrangement as defined in claim 17 wherein said electrode is connected to said supporting arm by one of said tubes, which is electrically conductive.

19. An arrangement as defined in claim 18 wherein said supporting arm is made of quartz.

20. An arranegment as defined in claim 18 wherein said supporting arm is made of alumina.

21. An arrangement as defined in claim 15 wherein means for protecting said electrode from being cooled is constituted by a solid element supporting said electrode from said supporting arm.

22. An arrangement as defined in claim 10 wherein said means for supporting said electrode comprise an electrical conductor conductively connected to said electrode, an outer tube of electrically insulating material surrounding and supporting said electrical conductor, and air supply means connected for conducting cooling air through the interior of said outer tube.

23. An arrangement as defined in claim 10 further comprising controllable means for feeding material into said vessel, said controllable means being connected to said circuit means for causing the rate at which material is fed into said vessel to be automatically varied in accordance with variations in the capacitance between said electrode and said liquid mass, and said circuit means include two adjustable contacts and a movable contact member which is displaceable between said two contacts in dependence on the value fo said capacitance, said circuit means further including control means connected between said contact member and adjustable contacts and said controllable means for increasing the rate at which material is fed into said vessel when said movable contact member touches one of said contacts and for decreasing the rate at which material is fed into said vessel when said contact member touches the other one of said contacts.

24. An arrangement as defined in claim 10 further comprising controllable means for feeding material into said vessel, said controllable means being connected to said circuit means for causing the rate at which material is fed into said vessel to be automatically varied at least partly in accordance with the time integral of variations in the capacitance between said electrode and such liquid mass.

References Cited

UNITED STATES PATENTS

| | | | |
|---|---|---|---|
| 2,585,607 | 2/1952 | Whitmore et al. | 214—18.2 |
| 2,618,395 | 11/1952 | Brabander. | |
| 2,625,593 | 1/1953 | Voorhies et al. | |
| 2,888,945 | 6/1959 | Marlow | 137—392 |
| 2,933,657 | 4/1960 | Maltby et al. | |

ROBERT G. SHERIDAN, *Primary Examiner.*

U.S. Cl. X.R.

73—290; 137—392